United States Patent [19]

Suzuki et al.

[11] 4,455,637
[45] Jun. 19, 1984

[54] DISC RECORD PLAYER WITH AUTOMATIC LOADING/UNLOADING ASSEMBLY

[75] Inventors: Hiroyuki Suzuki; Masayuki Taoka; Kiyoshi Watanabe, all of Higashihiroshima, Japan

[73] Assignee: Sharp Kabushiki Kaisha, Osaka, Japan

[21] Appl. No.: 286,467

[22] Filed: Jul. 24, 1981

[30] Foreign Application Priority Data

| Jul. 30, 1980 | [JP] | Japan | 56-2818 |
|---|---|---|---|
| Jul. 30, 1980 | [JP] | Japan | 56-2819 |
| Jul. 30, 1980 | [JP] | Japan | 56-2820 |
| Jul. 30, 1980 | [JP] | Japan | 56-2821 |
| Jul. 30, 1980 | [JP] | Japan | 56-2822 |
| Jul. 30, 1980 | [JP] | Japan | 56-2823 |
| Jul. 30, 1980 | [JP] | Japan | 56-2824 |
| Jul. 30, 1980 | [JP] | Japan | 56-2825 |
| Jul. 30, 1980 | [JP] | Japan | 55-109634[U] |
| Jul. 30, 1980 | [JP] | Japan | 55-109635[U] |
| Jul. 30, 1980 | [JP] | Japan | 55-109636[U] |
| Jul. 30, 1980 | [JP] | Japan | 55-109637[U] |
| Jul. 30, 1980 | [JP] | Japan | 55-109638[U] |
| Jul. 30, 1980 | [JP] | Japan | 55-109639[U] |
| Jul. 30, 1980 | [JP] | Japan | 55-109640[U] |
| Jul. 30, 1980 | [JP] | Japan | 55-109641[U] |

[51] Int. Cl.³ .................. G11B 25/04; G11B 1/00; G11B 3/60; G11B 17/02

[52] U.S. Cl. ................. 369/77.1; 369/75.1; 369/199; 369/249; 369/263; 369/270

[58] Field of Search .............. 369/75, 77, 244, 249, 369/255, 263, 270, 271, 199

[56] References Cited

U.S. PATENT DOCUMENTS

| 2,518,232 | 8/1950 | Giovannucci et al. | 369/77 |
|---|---|---|---|
| 2,670,211 | 2/1954 | Freimann et al. | 369/199 |
| 2,939,713 | 6/1960 | Winter | 369/77 |
| 2,992,006 | 7/1961 | Foufounis | 369/199 |
| 3,658,347 | 4/1972 | Cheeseboro | 369/77 |
| 4,040,107 | 8/1977 | Bryer | 369/77 |

FOREIGN PATENT DOCUMENTS

| 40880 | 2/1981 | European Pat. Off. | 369/77 |

Primary Examiner—Steven L. Stephan
Attorney, Agent, or Firm—Birch, Stewart, Kolasch & Birch

[57] ABSTRACT

A record player is disclosed which includes a turntable (35) movable at least between a first position for record loading and a second position for record unloading, a record support (10R) having at least a first position for removal of the record out of said player and a second position for mounting the record onto said turntable and a transmission device (13a) maintained in engaging relationship with said turntable for transmission of rotating torque from said turntable to said record support when said turntable is in the second position.

15 Claims, 23 Drawing Figures

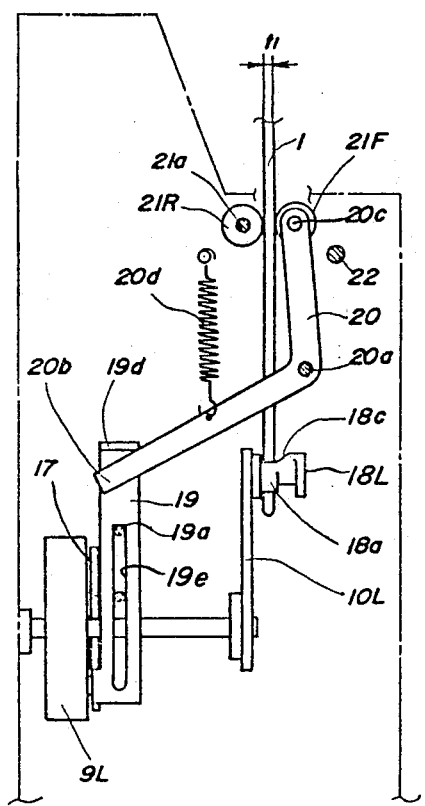
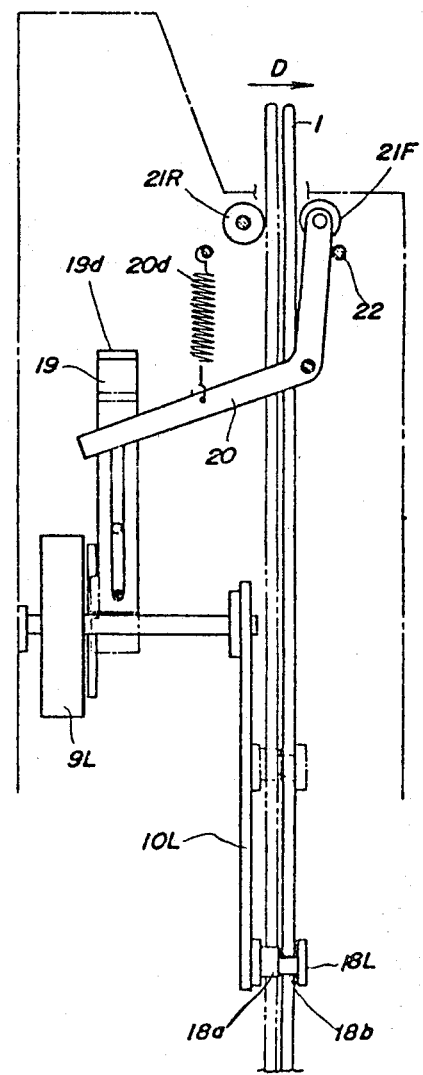
FIG.6 (a)
FIG.6 (b)

DISC RECORD PLAYER WITH AUTOMATIC LOADING/UNLOADING ASSEMBLY

BACKGROUND OF THE INVENTION

This invention relates to a disc record player, and more particularly to a vertically-positioning disc record player with a wide variety of features suitable for vertically playing of disc records.

An outstanding problem of the above mentioned sort of players is that the players assembly or disc records may be damaged or destroyed due to unexpected and unavoidable mechanical oscillation of a record carrier while the record is on the way in to be mounted onto a turntable. Another problem of the vertical type record players is difficulty in bringing the central opening of the disc record into alignment with a turntable shaft. Still another significant disadvantage of the conventional players is that the listener should place the player into a stop position in order to playback sound recordings on both major surfaces of disc records.

OBJECTS AND SUMMARY OF THE INVENTION

Accordingly, it is an object of the present invention to introduce a new concept of disc record players which overcomes the above discussed problems. It is another object of the present invention to provide a record player wherein a record support is driven by a turntable serving as a driving source and driving force is transmitted from the turntable to the record support via a transmission system when the turntable is moved to a backward position or when the record is spaced away from the turntable.

BRIEF DESCRIPTION OF THE DRAWINGS

For a more complete understanding of the present invention and for further objects and advantages thereof, reference is now made to the following description taken in conjunction with the accompanying drawings showing a record player according to a preferred embodiment of the present invention, in which:

FIGS. 6(a) and 6(b) are side views of respective components in the assembly shown in FIGS. 5(a) and 5(b);

DETAILED DESCRIPTION OF THE INVENTION

Figure 1:
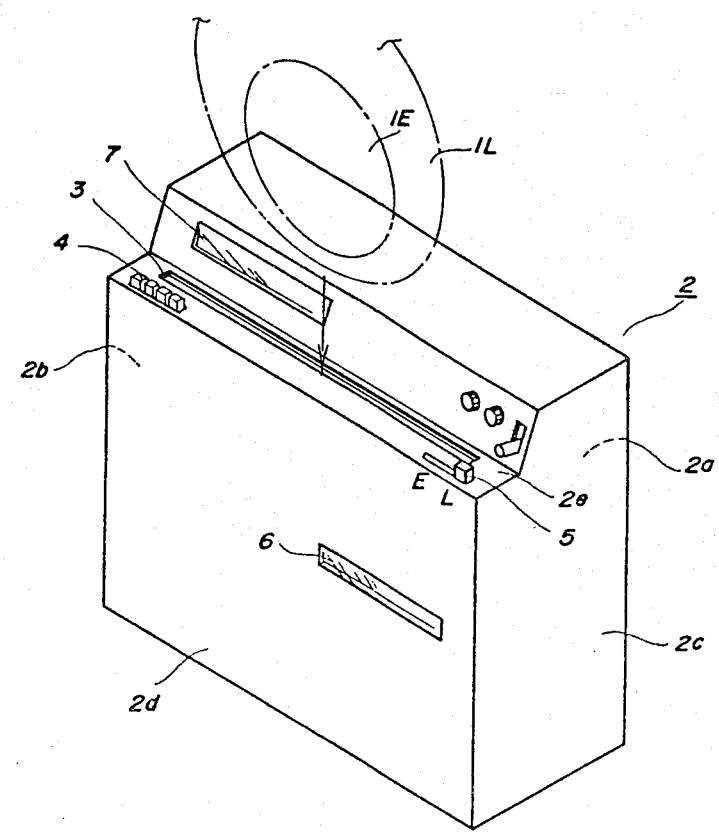
FIG. 1 is a perspective view.
Figure 2:
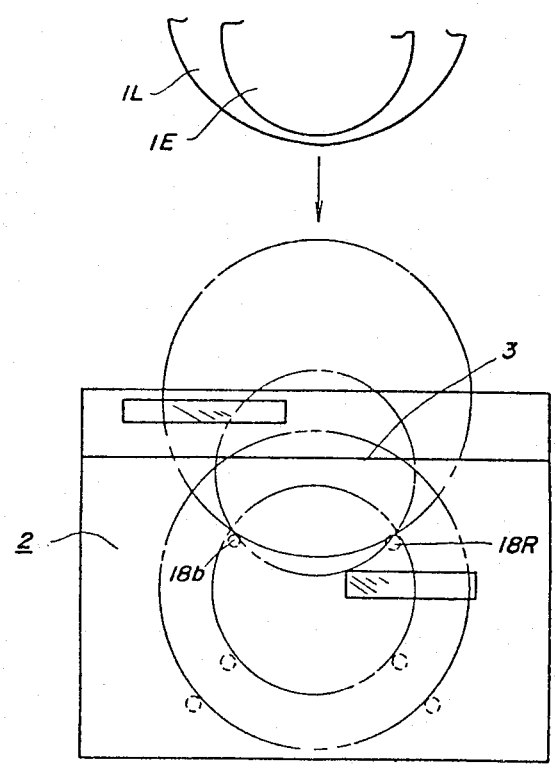
FIG. 2 is a front view showing insertion of a disc record.

Referring now to FIGS. 1 and 2, an LP disc record is labeled 1L and an EP disc record is labeled 1E. A record player is shown as being adapted such that the record (1L or 1E) may be inserted via a record inlet 3 provided on the body 2 of a player as depicted by the one-dot phantom line. With the aid of a record elevating assembly and a record mounting assembly as discussed below, the record is placed into play position especially in a vertical direction (as depicted by the two-dot phantom line in FIG. 2) for playback. It is understood that the record player shown herein is adapted to play both sides of the record.

In FIG. 1, actuator buttons 4 are actuated to operate a turntable, pickup arms, etc., within the player body and select modes of operation such as loading, unloading, playing, stopping of the record and so forth. A record size selection knob 5 is operatively fixed to a selection lever 63 to set the rotation rate of the turntable, the location of a record inlet guide and the starting position of the pickup arms, depending upon the size of the record to be played. To monitor tracing of the record now in play, there is provided in the player body 2 a front window 6 and a rear window 7.

Figure 3:
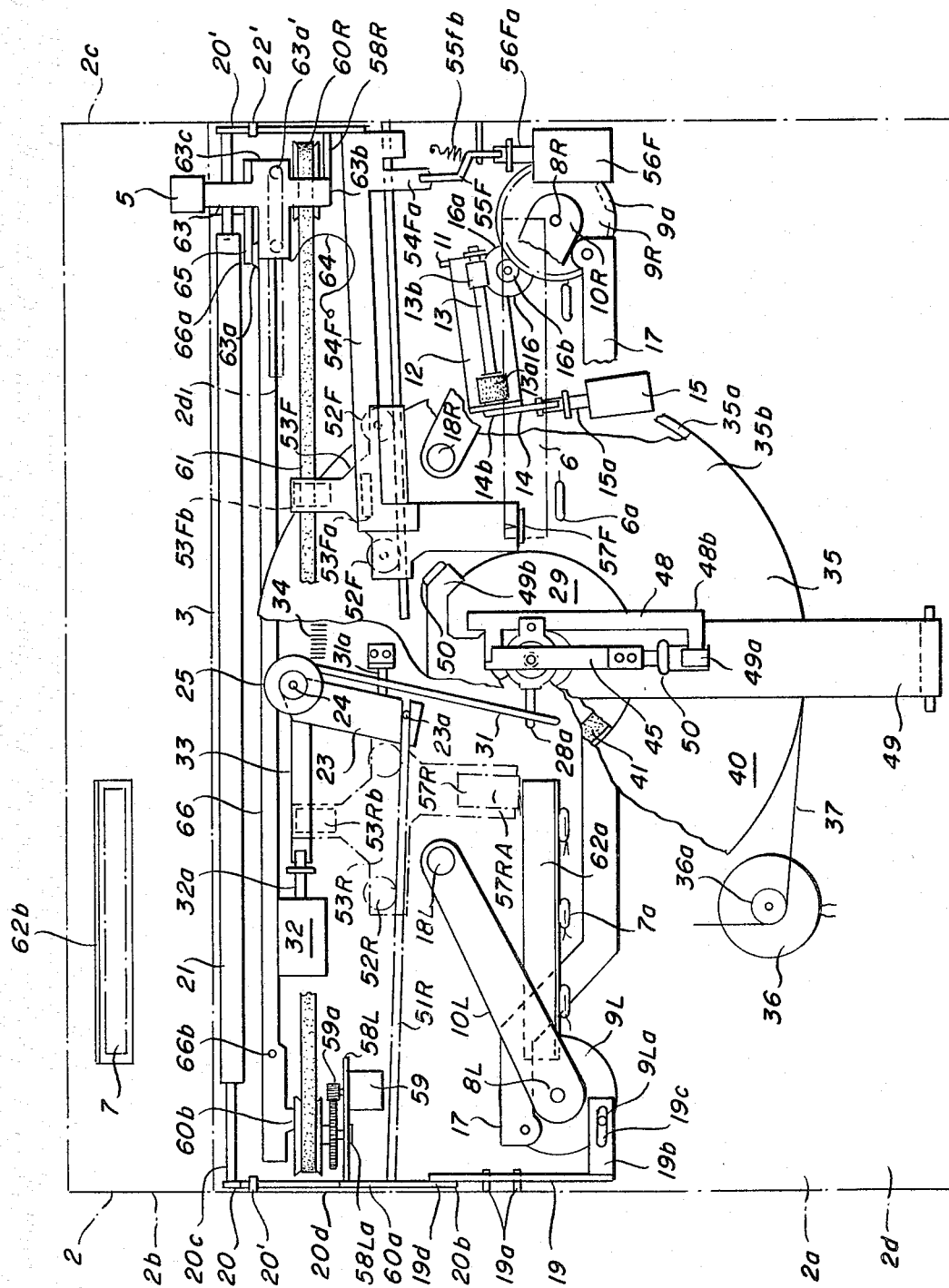
FIG. 3 is a partial cross-sectional view of a driving system for a record elevator.
Figure 4:
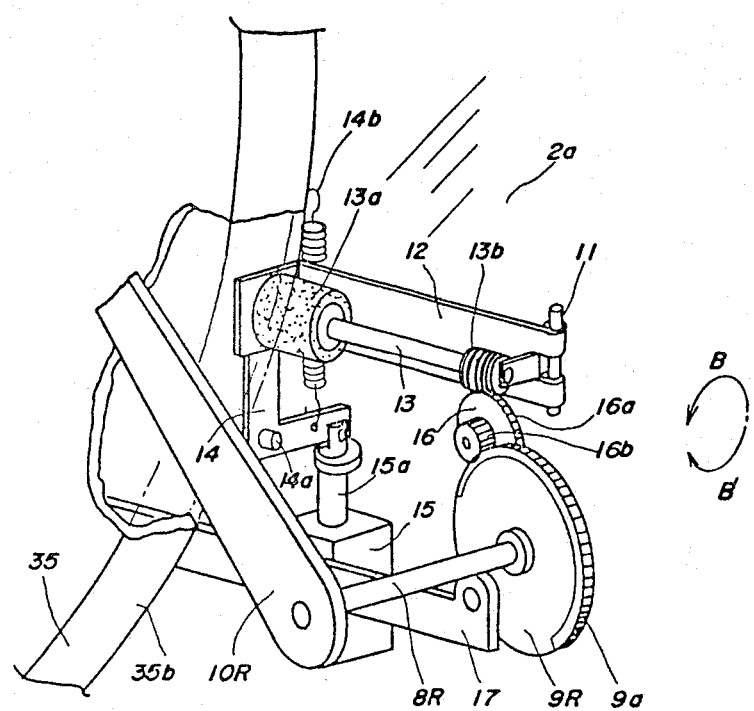
FIG. 4 is a perspective view of the driving system for the record elevator.
Figure 5A:
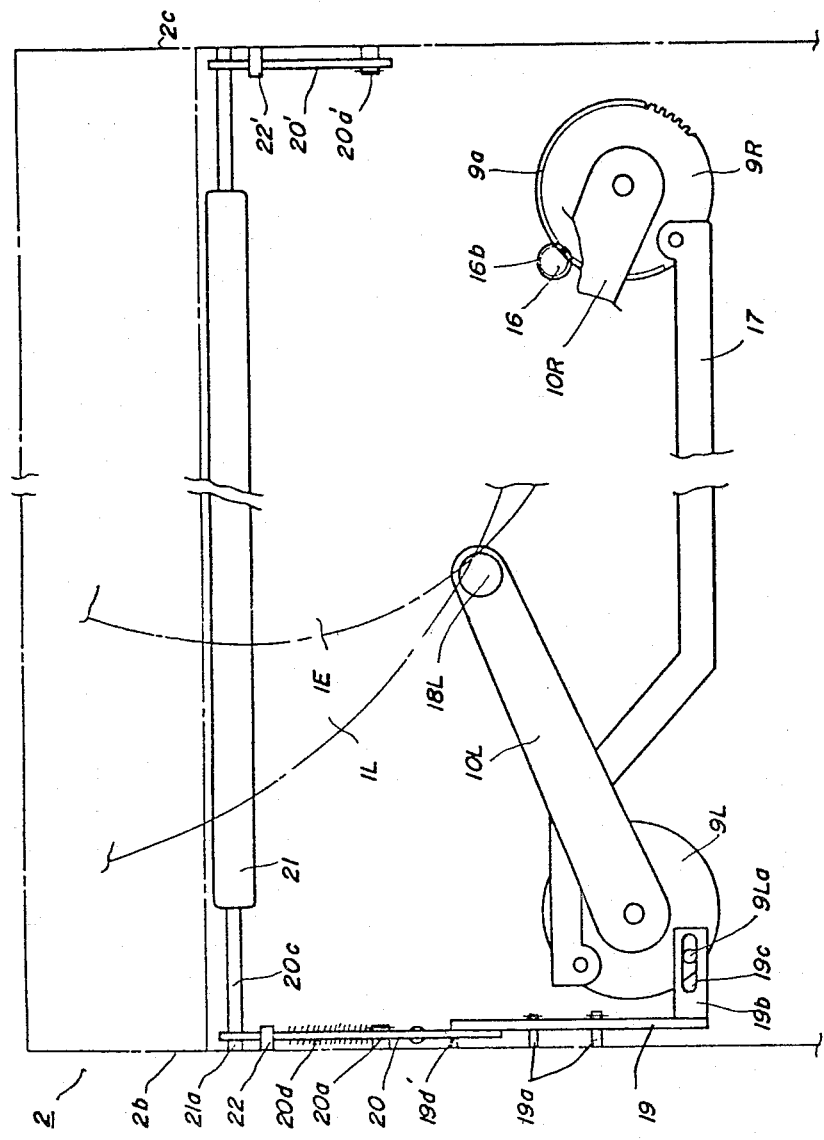
FIGS. 5(a) and 5(b) are front views showing an inlet guide assembly together with the record elevator.
Figure 5B:
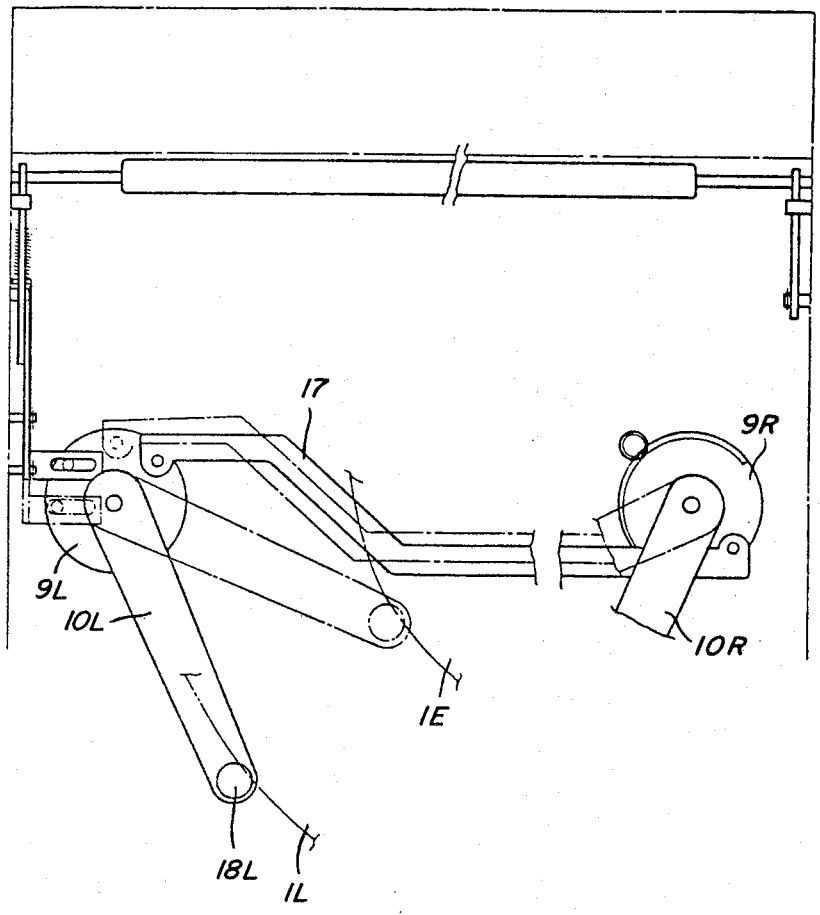

FIG. 3 is a view showing the whole of an internal structure of the player. The following description will go into details of the player with reference to FIG. 3 and succeeding drawings. It is noted that FIG. 4 is a perspective view of a driving system for the record elevating assembly, FIGS. 5(a), 5(b), 6(a) and 6(b) are front and side views of the record elevating assembly and the inlet guide assembly and FIGS. 7(a) and 7(b) are perspective views of a record mount. Fixed to a shaft 8R standing on a rear plate 2a of the player body for rotation are a rotating plate 9R and a support arm 10R for rotation with the shaft 8R as best shown in FIGS. 4 and 5(a) and 5(b). Further, a support plate 12 is rotatably held on a shaft 11 fixedly secured on the rear plate 2a through an angle not shown, which support plate 12 bears a rotatable shaft 13 carrying a rubber roll 13a and a worm gear 13b. A link 14 is secured on the rear plate 2a rotatable about a shaft 14a via an angle not shown, with its one end rotatably fixed to the shaft 13 of the support 12 and its remaining end rotatably fixed to a core 15a of a support arm-actuating plunger 15 resting on the rear plate 2a. The link 14 is constantly biased in the direction of the arrow B in FIG. 4 by the action of a spring 14b one end of which is held on the rear plate so that the rubber roll 13a is placed into pressure contact with a rear surface 35b of a flywheel 35 only when the plunger 15 is OFF (that is, the plunger is not energized) and a turntable 29 is in a backward position. A reduction gear 16 is rotatable on the rear plate 2a and has an increased diameter portion 16a engaged with the worm gear 13b and a decreased diameter portion 16b engaged with a geared portion 9a of the periphery of the rotating member 9R.

Figure 7:
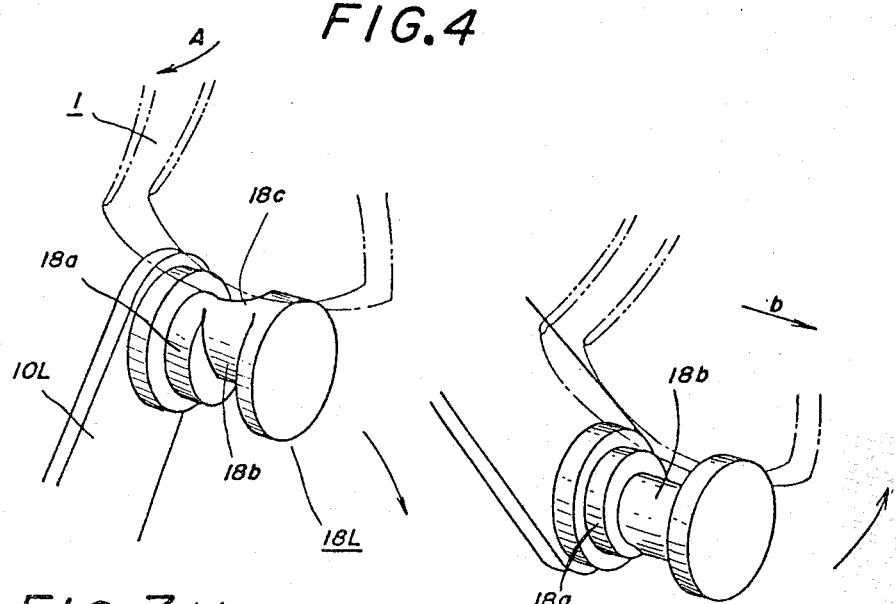
FIGS. 7(a) and 7(b) are perspective views showing operation of a record mount.

As indicated in FIGS. 3, 5a, 5b, 6a and 6b, one end of a link arm 17 is rotatably held on the rotating plate 9R with its remaining end rotatably held on a rotating plate 9L attached to a shaft 8L which is symmetric with the shaft 8R on the rear plate 2a. The shaft 8L carries a support arm 10L which is also symmetric with the support arm 10R and rotatable with the rotating plate 9L. The support arms 10R and 10L, as shown in FIGS. 5 through 7, are provided with record mounts 18R and 18L each of which includes a first mount portion 18a for holding the record during a period of time from insertion of the record and lowering of the record, a second mount portion 18b for holding the record during elevating thereof and an inclined sliding surface 18c contiguous to the second mount portion 18b for shifting the record to the first mount portion 18a after elevating of the record, as shown in FIGS. 7(a) and 7(b).

With such an arrangement, the rotating movement of the flywheel 35 is reduced and transmitted to the rotating plate 9R via the rubber roll 13a, the shaft 13, the worm gear 13b and the reduction gear 16, thus actuating the left and right support arms 10R and 10L by way of the link arm 17, the rotating plate 9L and the shafts 8R and 8L for elevating and lowering of the record as discussed in detail below.

As is seen from FIGS. 5a, 5b, 6a and 6b, a pin 19a stands on a left side wall 2b of the player body and a slide plate 19 is held to be slidable in a vertical direction in FIGS. 5 and 6 via an elongated slot 19e. A bent portion 19b of the slide plate 19 is engaged with a pin 9La standing on the rotating plate 9L via an elongated slot 19c so that the slide plate may slide with rotation of the rotating plate. Another bent portion 19d of the slide plate 19 is removably engageable with an engaging portion 20b at one end of an arm 20 which is held rotatable about a pin 20a resting on the left side wall 2b. There is mounted on the arm 20 an inlet guide roll 21F by means of a shaft 20c, which roll serves one of guides during insertion of the record. The other end of the shaft 20c is fixed to an arm 20' which in turn is fixed rotatably to a right side wall 2c of the player body by means of a pin 20'a. Although the arms 20 and 20' and the guide roll 21F are biased clockwise by the influence of a spring 20d extending between the arm 20 and the left side wall 2b as seen from FIGS. 5a, 6a and 6b, their movements are limited by the bent portion 19d of the slide plate 19 when the record is at an elevated level as shown in FIGS. 5(a) and 6(a) or when the arm 10 is rotated to its upper limit. There is therefore developed a space $t_1$ equal to the thickness of the record 1 between the guide roll 21F and another inlet guide roll 21R which is rotatable on a shaft 21a secured on the left and right side walls 2b and 2c, thus permitting insertion of the record. A pair of pins 22 and 22' standing on the left and right side walls 2b and 2c is to limit the rotating movements of the arms 20 and 20' during loading of the record as described below.

With such an arrangement, the rotating movement of the rotating plate 9L enables the slide plate 19 to slide and sets the same free of restrictions by the arm 20 during lowering of the record, thus avoiding interference between the record and the guide roll 21 during loading of the record as will be described hereinafter.

Figure 8:
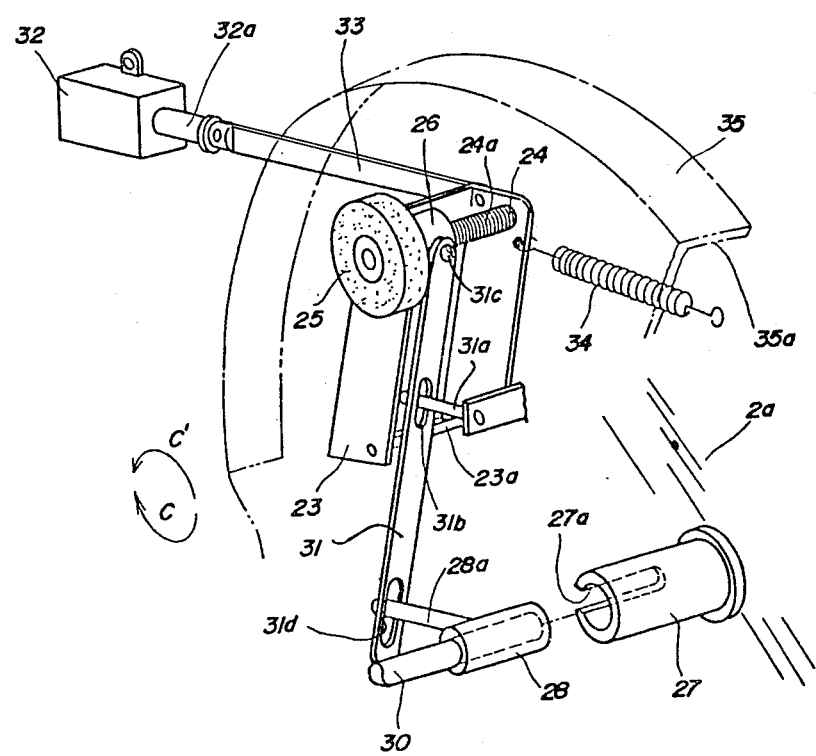
FIG. 8 is a perspective view of a turntable driving assembly.
Figure 9A:
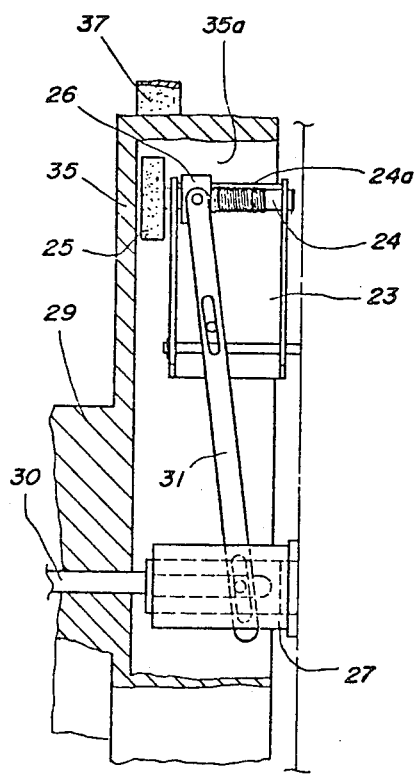
FIGS. 9(a) and 9(b) are cross-sectional side views of part of the assembly of FIG. 8.
Figure 9B:
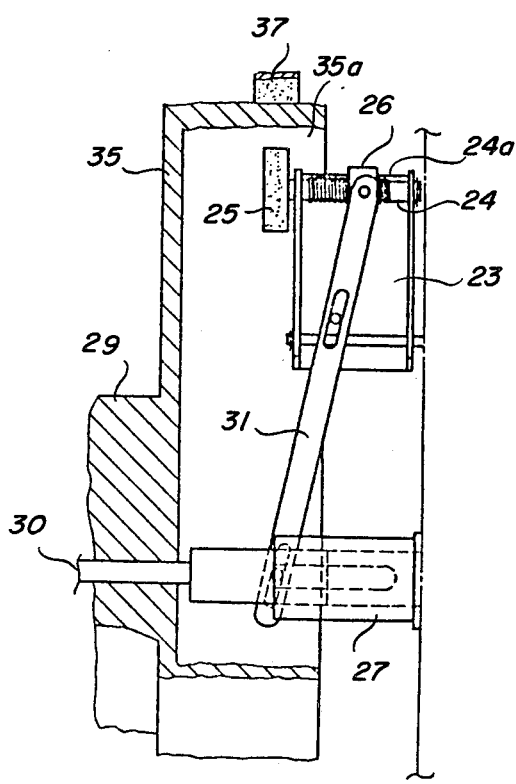
Figure 10:
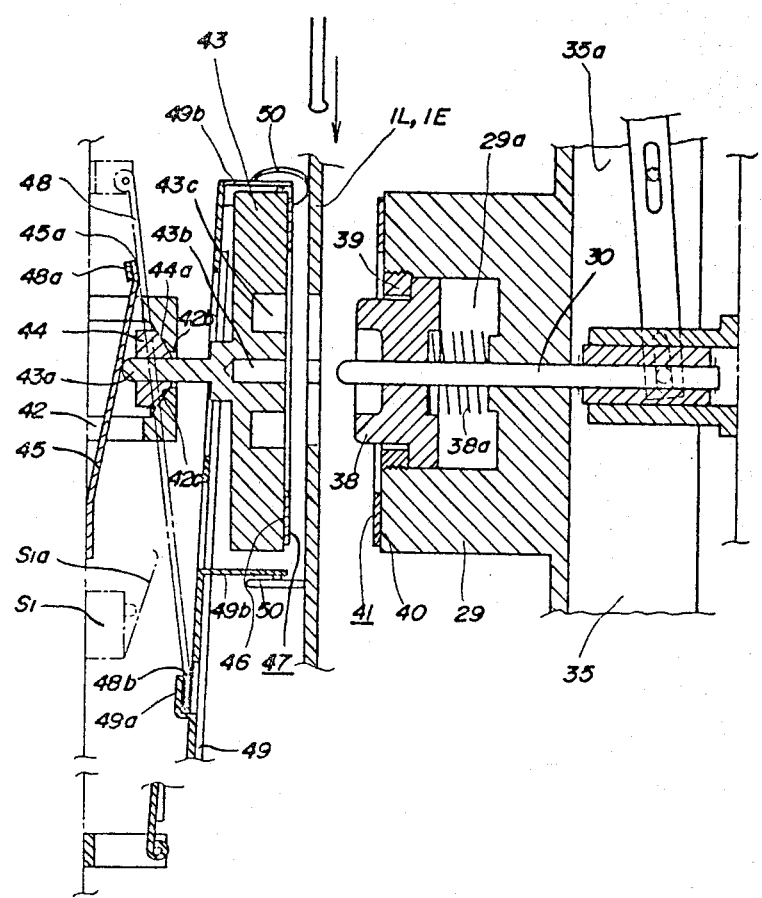
FIGS. 10(a) to 10(c) are cross-sectional views of a record pressing assembly.
Figure 10:
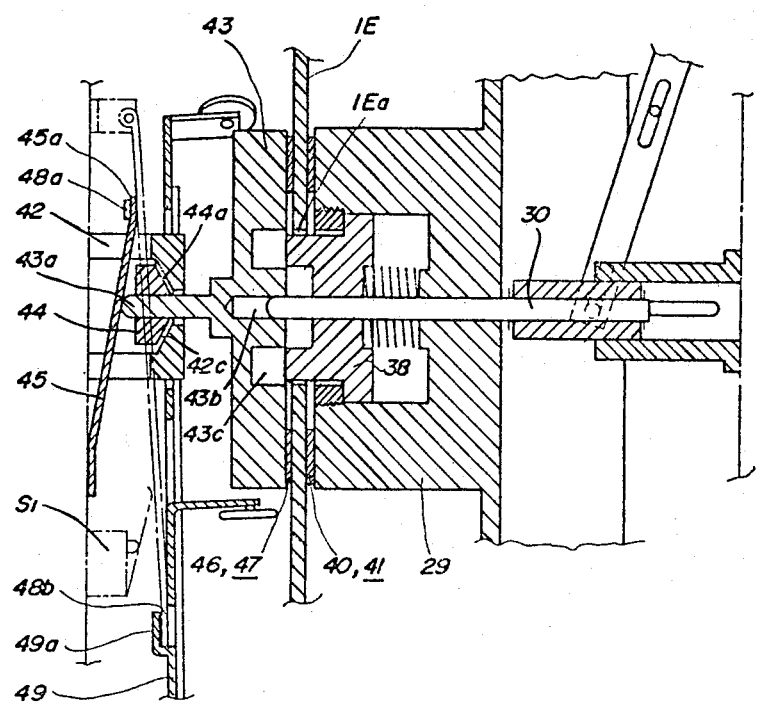
Figure 10:
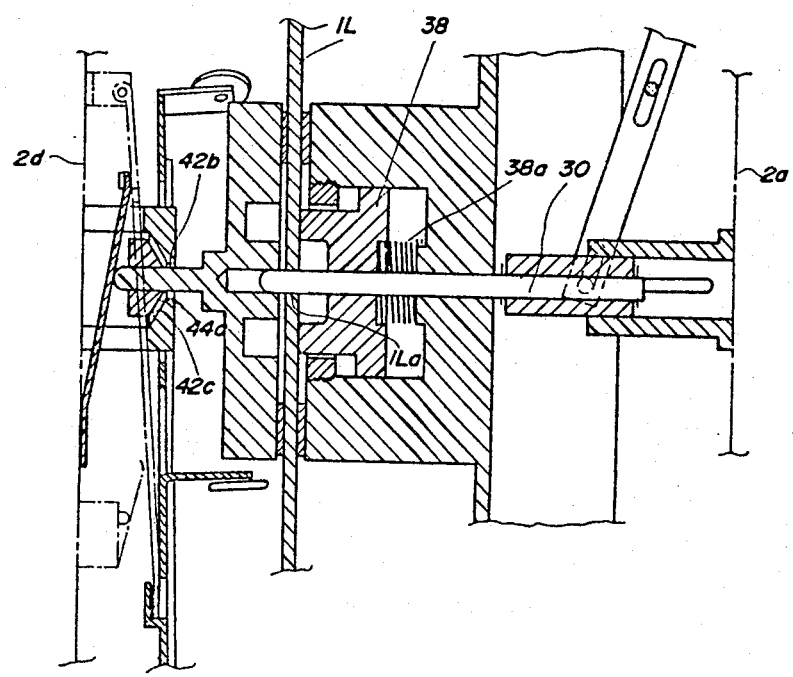
Figure 11:
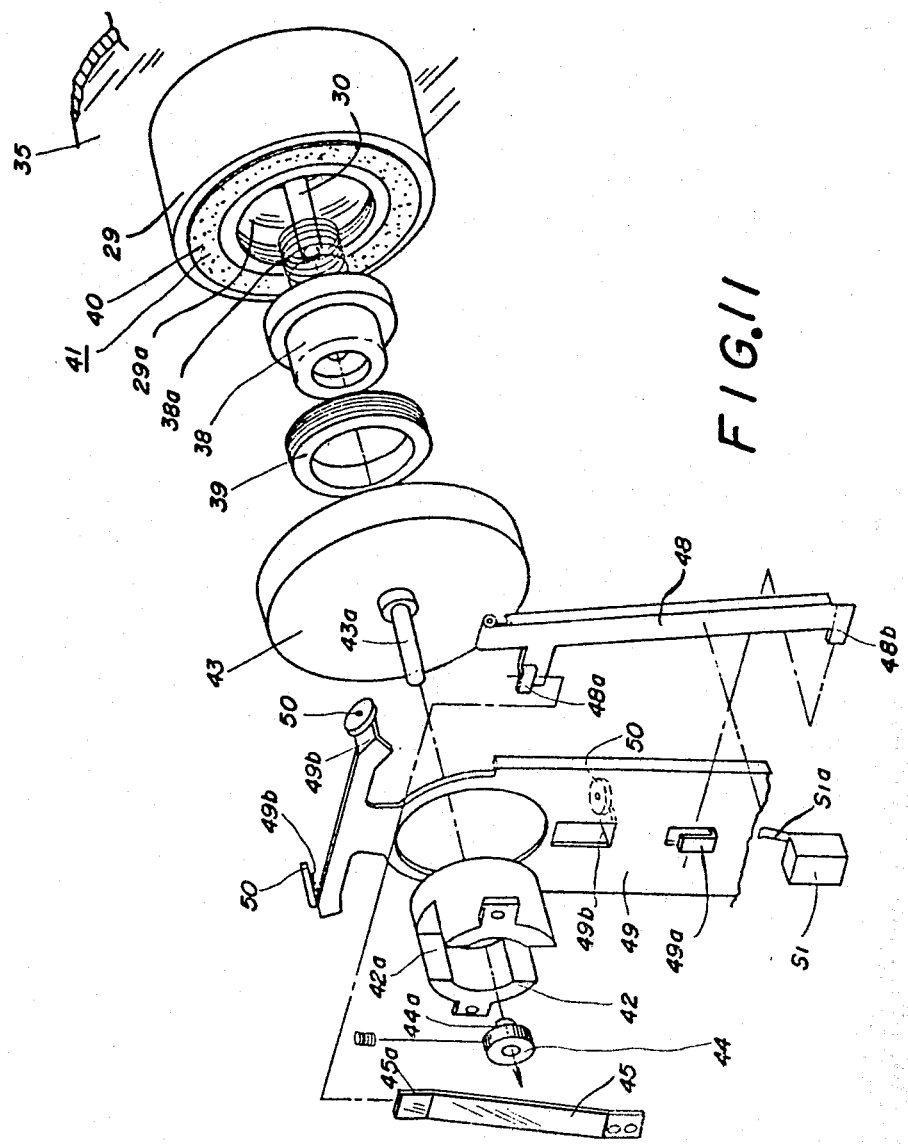
FIG. 11 is an exploded perspective view of the assembly of FIGS. 10(a) to 10(c)

FIGS. 3 and 8 to 11 show the record loading assembly and a record center guide assembly. More particularly, FIGS. 8 and 9 depict a driving system for the record loading assembly and FIGS. 10 and 11 depict the record pressing assembly and the record center guide assembly.

As will be seen from FIGS. 8 and 9, a support plate 23 is held rotatable about a shaft 23a resting on the rear plate 2a. The support plate 23 carries a driving shaft 24 having a threaded portion 24a and one end of the rubber roll 25 engageable with an inner surface of the flywheel 35 is fixed to the driving shaft 24. The threaded portion 24a receives a nut 26 which is slidable on the shaft 24 in response to the rotating movement of the driving shaft 24. Located substantially at the center of the rear plate 2a is a sliding bearing 27 which is provided with a cutout 27a to support slidably a rotating bearing 28 having a driven pin 28a received within the cutout 27a. On the rotating bearing 28 there is provided a turntable shaft 30 carrying a turntable 29 for rotation. A shaft 31a is further provided on the rear plate 2a by means of an angle, which bears slidably a driving lever 31 via an elongated slot 31b. The driving lever has its one end connected to the nut 26 via a screw 31c and its other end connected to the driven pin 28a on the rotating bearing 28 via an elongated slot 31d. The rear plate 2a also bears a plunger 32 with an iron core 32a interlocked with the support plate 23 by means of a link arm 33. It is noted that the support plate 23 is biased in the direction of the arrow C in FIG. 8 under the influence of a spring 34 held in conjunction with the rear plate 2a. The flywheel 35 in FIG. 8 is integral with the turntable 29 (not shown in FIG. 8) and driven to rotate by a reversible double motor 36 as shown in FIG. 3 by means of a pulley 36a and a belt 37. An inner surface of the flywheel is labeled 35a.

It is clear from the foregoing description that the rotating movement of the flywheel is transmitted to the driving shaft 24 by means of the rubber roll 25 and the driving lever 31 is rotated by trusting force from the threaded portion 24a and the nut 26, thus shifting the rotating bearing 28 with respect to the sliding bearing 27 together with the turntable shaft 30, the turntable 29 and the flywheel 35 for the purpose of loading and unloading the record.

As will be seen from FIGS. 10a, 10b, 10c and 11, the turntable 29 is provided with a recess 29a which receives an EP adapter 38 via a spring 38a while being clamped with an annular spring 39. As is well known in the art, the turntable 29 carries a rubber sheet 40 to make up a record-mounting surface 41. Furthermore, the outer diameter of the turntable is smaller than a label surface on the record.

On the front plate 2d of the player body 2 there is provided a record support 42 which has a cutout 42a traversing a leaf spring 45 and a continuous tapered surface 42c at its central opening 42b. A pressure disc 43 has its support shaft 43a fitted into the central opening 42b of the record support 42 and clamped with a stopper 44. It is however noted that, when the record support 43 is in alignment with the center, the support shaft 43a is of such diameter as to be out of contact with the central opening 42b. On the stopper 44 there is also provided a tapered surface 44a with the same inclination as that of the tapered surface 42c of the record support 42. The tip of the support shaft 43a of the record support 43 is urged downwardly with a spring 45 having its one end resting on the front plate 2d. When the record is not loaded, the tapered surfaces 42c and 44a of the record support 42 and the stopper 44 bring the center of the pressure disc into agreement with the center of the turntable shaft 30. In addition, there is provided another rubber sheet 46 to set up a second record-mounting surface 47 at the front of the pressure disc 43. There is also provided at the center of the pressure disc 43 a central opening 43b which is engageable with the turntable shaft 30 and a recess 43c in which the EP adapted is fitted during loading of the EP record. As stated previously, the outer diameter of the pressure disc is smaller than the label surface of the record.

Accordingly, the record 1L or 1E is placed into loading position with the aid of the record elevating assembly and the turntable shaft 30 and the turntable 29, etc., are moved forwardly with the aid of the driving system of the loading assembly. Finally, the record 1L or 1E is fixed between a pressing surface of the turntable 29 and a pressure plate 47 under the force of the spring 45.

Rotatable held on the front plate 2d are one end of a conversion lever 48 and one end of a record center guide plate 49. A tip bent portion 45a of the spring 45 is engaged with a bent portion 48a of the conversion lever 48 and the counterpart 48b of the conversion lever 48 is engaged with a bent portion 49a of the center guide plate 49. On three bent portions 49b of the center guide plate 49 there is secured a record center guide wheel 50 which is rotatable in the circumferential direction.

Under the influence of the spring 45, the center guide plate is in forwardly-inclined rotating position and the guide wheel 50 is protruded slightly forwardly of the record-mounting surface 47 of the pressure disc 43 so that the center guide plate may guide the record during its elevating course by the record elevating assembly and also guide the record 1L or 1E while rotating due to friction with the rubber sheet 40 and moving backwardly due to deflection of the spring and rotation of the conversion lever when the turntable 29 is rotated and moved forwardly and backwardly during loading of the record.

Attached to the front plate 2d is a mounting completion switch S₁ with its actuator S₁a positioned to be switched upon rotation of the conversion lever 48. The switch S₁ is connected to a control circuit not shown so that the rubber roll 25 is placed into pressure contact with the inner surface 35a of the flywheel by energization of the plunger 32 of FIG. 8. As a consequence, the turntable 29 is moved forwardly via various mechanisms and stopped by disenergizing the plunger 32 via the control circuit once the record 1L or 1E is properly mounted onto the mounting surfaces 41 and 47 of the turntable 29 and the pressure disc 43 has been confirmed by the amount of deflection of the spring 45 (that is, the amount of rotation of the conversion lever 48).

Referring now to FIGS. 12 to 16, there is shown a pickup assembly, a pickup fast forward assembly and a record size switch assembly.

The pickup assembly of the player shown herein is of the type wherein it lowers to contact sound grooves in the record along the tapered surface due to its gravity and comes in part into contact with a rubber belt rotating at a predetermined speed by moving a pickup stylus away from the sound grooves during fast forward driving. It should be noted that the pickup assembly includes a pair of pickup arms symmetrical with each other for providing the feasibility of reproducing recordings on both major surfaces of the record without the need to turn over the disc record.

As seen from FIGS. 3, 12a, 12b and 14, a guide rail 51F is installed on the right side wall 2c (not shown in FIGS. 12a, 12b and 14) of the player body 2 with an inclination gradually decreasing toward the center of the turntable 29. Mounted on the guide rail 51F is one of the two pickup 53F for front playback. The guide rail 51F is inclined such that the pickup arm 53F moves toward the center of the turntable 29 on the guide rail 51F due to its gravity exerted toward the center of the turntable 29 and its inward force caused by tracing of the sound grooves.

Figure 12:
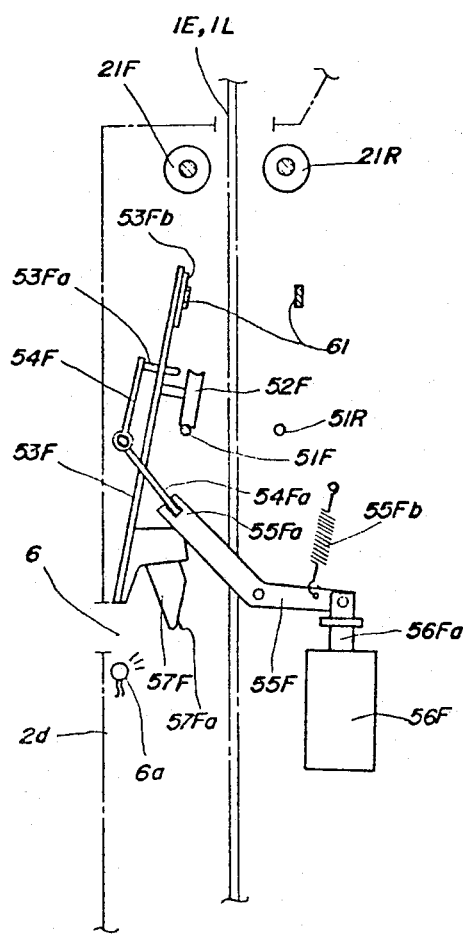
FIGS. 12(a) and 12(b) are side views of a front pickup assembly.
Figure 12:
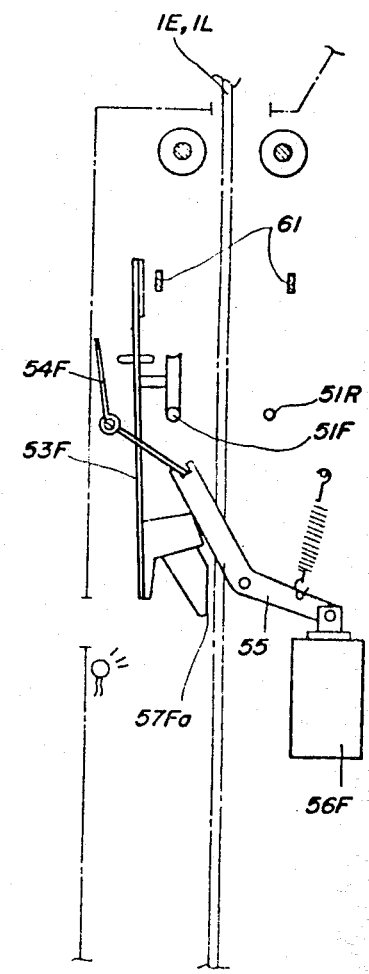

One end of an arm-elevating actuator 54F is held rotatable on the right side wall 2c (not shown in FIG. 12), with the other end thereof being likewise held on the front plate 2d by means of an angle not shown. An end 55Fa of a link 55F held rotatable on the right side wall 2c is engaged with a bent portion 54Fa of the actuator 54F. The remaining end of the link 55F is interlocked with a core 56Fa of an arm-elevating plunger 56F and biased counterclockwise as shown in FIG. 12a under the influence of a spring 55Fb attached to the right side wall 2c. This results in that the link 55F rotates the actuator 54F clockwise as shown in FIG. 12a and the actuator 54F in turn presses a slide ring 53Fa secured rotatably on the pickup arm 53F, thus rotating the pickup arm 53F clockwise about the guide rail 51F as shown in FIG. 12a and moving a pickup stylus 57Fa away from the disc recod 1L or 1E. A cartridge 57F is held at the tip of the pickup arm. The remaining end of the pickup arm is formed with a driven portion 53Fb of typically rubber which may be held in tight contact with a fast forward rubber belt 6P as discussed below. As described above, the front plate 2d for observation of tracing of the grooves in the front major surface of the record is viewable preferably with the help of lamps 6a.

Figure 15:
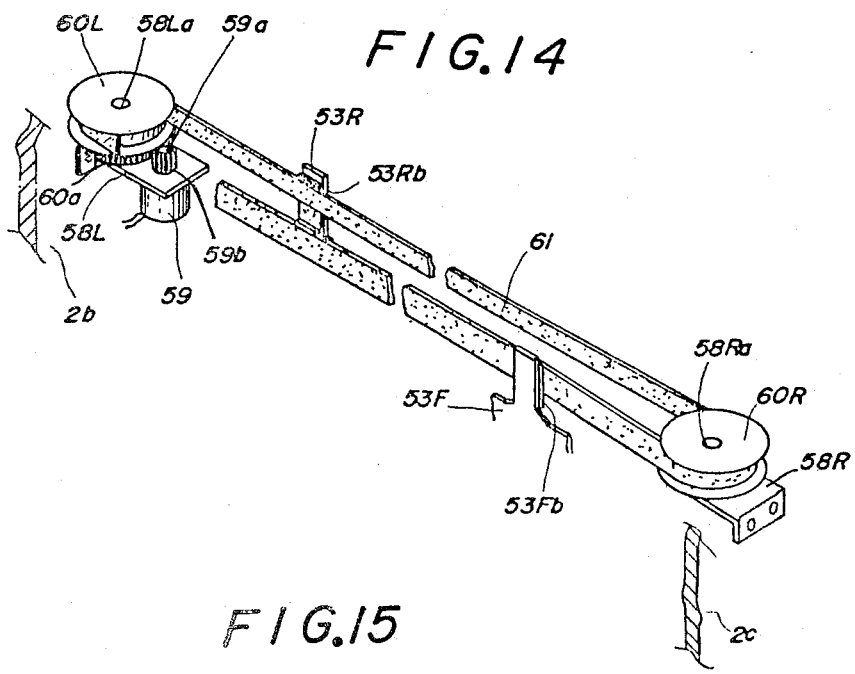
FIG. 15 is a perspective view of a pickup fast forward assembly.

It is clear from FIGS. 3 and 15 that an angle 58L carrying a pickup fast forward motor 59 is disposed on the left side wall 2b. A pinion gear 59b attached to an output shaft 59a of the motor 59 mates with a gear 60a secured rotatably on a shaft 58La standing on the angle 58L. The gear 60a is provided integrally with a pulley 60L. Similarly, the right side wall 2c bears an angle 58R and a shaft 58Ra bears a rotatable pulley 60R. A pickup fast forward rubber belt 61 is disposed to straddle these pulleys 60R and 60L while being properly driven by the motor 59. The driven portions 53Fb and 53Rb of the pickup arms 53F and 53R are adapted to be in contact with the belt 61.

Figure 13:
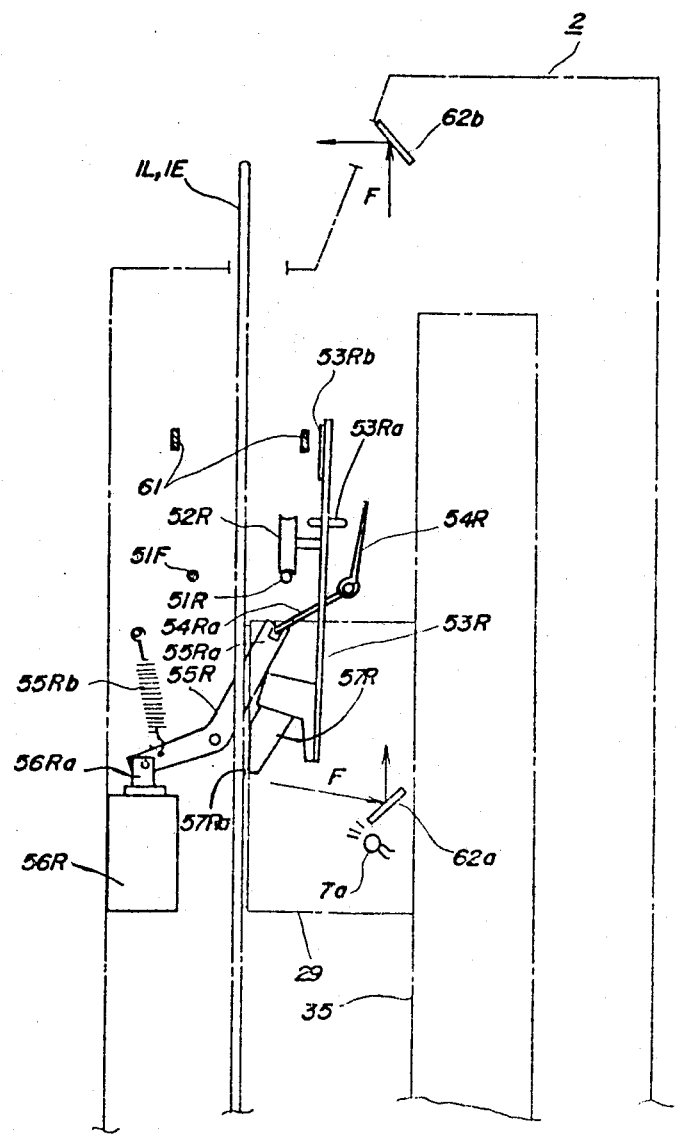
FIG. 13 is a side view of a back pickup assembly.
Figure 14:
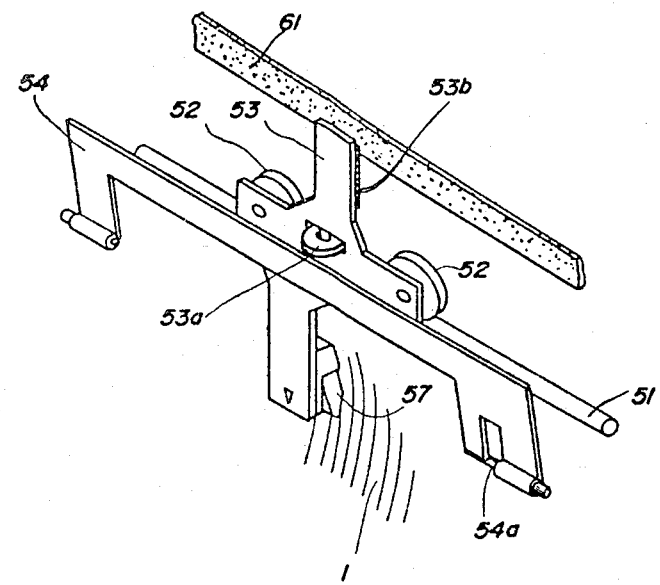
FIG. 14 is a perspective view of a principal part of the pick up assembly.

FIG. 13 shows a pickup assembly for rear playback and its associated display. Since the pickup assembly for rear playback is symmetrical in position with that for front playback and has a configuration similar to the same, duplicated description will be eliminated hereinafter. By means of an angle not shown, a mirror 62a is disposed in the neighborhood of a cartridge 57R of the rear playback pickup assembly to cooperate with a mirror 62b in the proximity of the rear window 7 in facilitating observation of tracing of the grooves by the cartridge 57R from an optical path. Lamps 7a are provided behind the mirror 62a for illumination.

Figure 16:
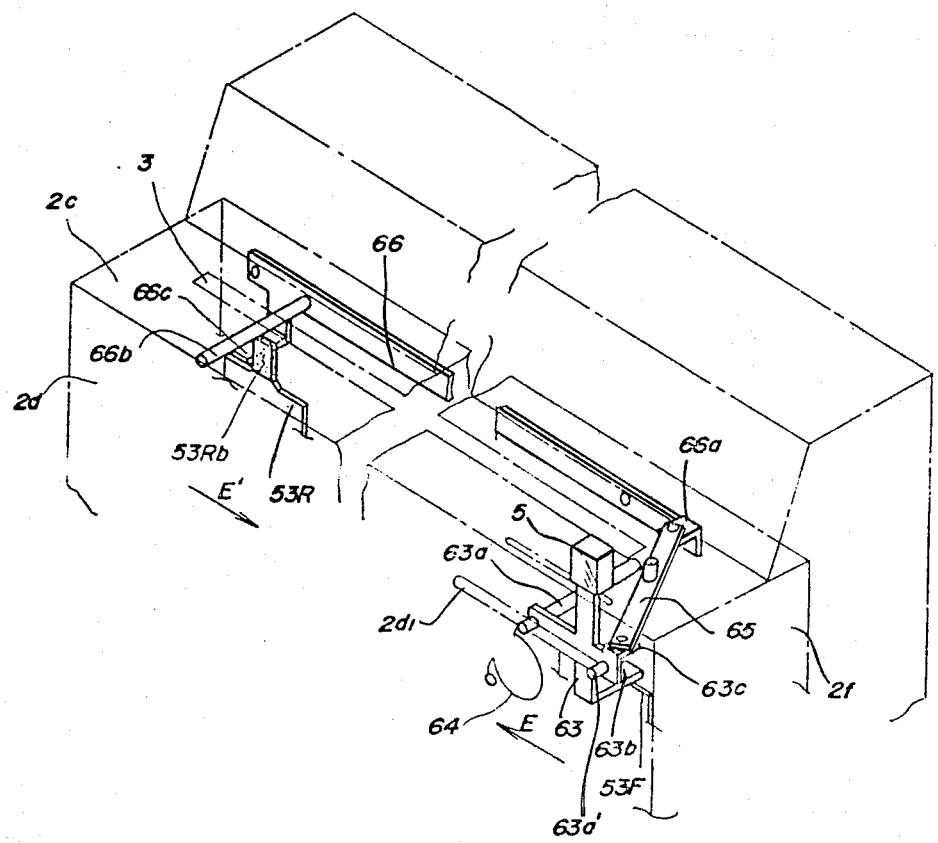
FIG. 16 is a perspective view of a record size change-over assembly.

FIG. 16 is a perspective view of the record size switch assembly in LP record mode. Slidably mounted on the front plate 2d a switch lever 63 by use of a guide shaft 63a and a pin 63a', which lever is constantly biased to limits of the sliding movement under the influence of a spring 64 extending between the pin 63a and the front plate. A bent portion 63b of the switch lever 63 is disposed in contact with a side portion of the driven portion 53Fb of the front playback pickup arm 53F (not shown in FIG. 16). The guide shaft 63a extends below the inlet 3 so as to guide the periphery of the record during its insertion. Secured rotatably on another bent portion 63c of the switch lever 63 is one end of a link 65 which is held rotatable on a top wall 2e of the player body 2. The remaining end of the link 65 is interlocked rotatably with a bent portion 66a of a slide plate 66 slidable on an inner side wall 2f of the player body 2. The sliding plate 66 is provided with a guide shaft 66b which cooperates with the above mentioned guide shaft 63a in guiding the periphery of the record. In addition, likewise the bent portion 63b of the switch lever 63 and the bent portion 66c is disposed in contact with a side portion of the driven portion 53Rb of the rear playback pickup arm 53R.

Upon actuation of a switch knob 5 on the switch lever 63 the switch lever 63 and the sliding plate 66 are switchable between EP record position and LP record position. In addition to guiding the periphery of the record and limiting the operating position of the pickup arms the switch serves to select the rotating rate of the motor 36.

The above shown and described player will operate in the following manner by reference to FIGS. 1 through 11. As seen from FIG. 1, the disc record 1L or 1E is first inserted into the inlet 3. In this case, the guide rolls 21F and 21R operate in the direction of the thickness of the record as seen from FIGS. 5a, 5b, 6a and 6b, whereas the guide shafts 63a and 66b operate in the circumferential direction. When this occurs, the support arms 10R and 10L are in its upper limit rotation position as indicated in FIG. 7a and the sliding inclined surfaces 18c of the record mounts 18R and 18L are ready to receive the record. Accordingly, when the record 1L or 1E is placed on the inclined surfaces, it moves toward the inclined surfaces as depicted by the arrow A and then held in position contiguous to the mount portion 18a. This situation is depicted by the one-dot phantom line in FIG. 2.

Under these circumstances, one of the actuator buttons 4 is actuated to enable the motor 36, the plungers 15 and 32 and so forth to complete loading of the record.

When the record-loading button of the actuator buttons 4 is selected, the motor starts rotating clockwise in FIG. 3 under the control of the control circuit, driving the the flywheel 35 in the same direction via the pulley 36a and the belt 37. For this reason the rubber roll 13a in contact with the rear surface 35b of the flywheel 35 under the influence of the spring 14b starts rotating in the direction of the arrow B in FIG. 4. This rotating movement is transmitted to the rotating plate 9R via the shaft 13, the worm gear 13b and the geared portions 16a, 16b and 9a, rotating the rotating plate 9R counterclockwise in FIG. 5(a). It is also noted that the rotating movement of the rotating plate 9R is transmitted to the left side rotating plate 9L by means of the link arm 17, rotating the last named plate clockwise in FIG. 5(a). The rotating movements of these rotating plates 9R and 9L allow the support arms 10R and 10L to lower the record mounts 18R and 18L via the respective shafts 8R and 8L. The record 1L or 1E seated on the record mounts 18R and 18L, as indicated in FIG. 5(b), falls to the position as depicted by the two-dot phantom line when the rotating plate 9, the link arm 17, the support arm 10 and so forth reach the position denoted by the solid line in the case of the LP record 1L and when they reach the position as denoted by the one-dot phantom line in the case of the EP record 1E. By an arm rotation position detector not shown, the plunger 15 of FIG. 4 is therefore energized to rotate the support plate 12 by means of the link 14 and prevent lowering of the record 1E or 1L by spacing the rubber roll 13a away from the rear surface 35b of the flywheel, thus completing positioning of the record (that is, the record center is brought into aligment with the turntable shaft 30). It is noted that the plunger 15 is switched OFF after the turntable moves forwardly as will be described later. The rotation position of the support arm 10 is selected by the record size selection lever 63 of FIGS. 3 and 16 and the control circuit not shown.

Concurrently with lowering of the record 1 the front guide roll 21F is shifted to unlocked position with rotation of the rotating plate 9L. That is, as shown in FIG. 5(a), when the rotating plate 9L rotates clockwise in FIG. 5(a), the slide plate 19 interlocked with the pin 9La via the elongated slot 19c moves upwardly. It is noted that the slide plate 19c is constantly urged to rotate in the locking direction or clockwise in FIG. 6(a). The arm 20 which has been inhibited from rotating by the bent portion 19d of the slide plate 19, therefore starts rotating in the same direction and reaches the position as clamped with the pin 22 as shown in FIG. 6(b). Accordingly, the slide plate 19 never interfers with the guide roll 21 even when the record 1 moves forwardly and rotates in the loading position during pressing of the record 1 as depicted in FIG. 6(b).

After the record 1 is settled in the loading position and the plunger 15 is switched ON in response to the support arm rotation position detector as mentioned previously, the plunger 32 of FIG. 8 is energized under control of the control circuit to rotate the support plate 23 about the shaft 23a against the spring 34 via the interlock arm 33 in the direction of the arrow C'. For this reason the rubber roll 25 is placed into pressure contact with the inner surface 35a of the flywheel and rotated in the direction of the arrow C. Under the condition as shown in FIG. 9(a) the nut 26 moves right on the shaft 24 by the screwing force from the threaded portion 24a coaxial with the rubber roll 25 and the nut 26. The driving lever 31 interlocked with the nut 26, therefore, rotates about the shaft 31a clockwise in the same figure of the drawings so that the rotating bearing 28 with its driven pin received within the elongated slot 31d moves left within the sliding bearing together with the turntable shaft 30, the turntable 29 and the flywheel 35 as shown in FIG. 9(b).

The forward movements of the turntable 29, etc., complete the loading of the record as will be more clearly understood from FIGS. 10a, 10b, 10c, 11, 6(b) and 7b. After positioning by the record elevating assembly, the record stands as shown in FIG. 10(a), with its front face in contact with three guide holes 50 in the center guide plate 49 in the forwardly-inclined rotating position under the influence of the leaf spring 45 and its rear face in contact with the support arms 10R and 10L (not shown in FIG. 10) without forward or backward movement. When the turntable 29 is moved forwardly as well as the turntable shaft 30 under these circumstances, the EP adapter 38 is fitted into the central opening 1Ea of the EP record 1E and its center shaft 43a is pressed by the spring 45. The turntable shaft 30 and the EP adapter 38 plunge into the central opening 43b of the pressure disc 43 and the recess 43c by the actions of the tapered surface 44a of the stopper 44 and the tapered surface 42c of the record support 42. Therefore, the record 1E is sandwiched between the mounting surface 41 of the turntable 29 as defined by the rubber sheet 40 and the counterpart 47 of the pressure disc 48 as defined by the rubber sheet 46. In order to gain force enough to hold the record in this position, the turntable 29 moves forwardly to a slight extent together with the record 1E and the pressure disc 43 while deflecting the spring 45. Dut to this forward movement the record 1E advances in the direction of the arrow D as shown in FIGS. 6(b) and 7(b) and shifts from the first mount portion 18a of the record mount 18 to a floating position on the second mount portion 18b so as to avoid any interference with the record mount 18 and the support arm 10. The pressure disc 43 is constantly held in contacting relationship under the influence of the spring as is seen from FIG. 10(a). Because the tapered surface 44a of the stopper 44 is disengaged from the tapered surface 42c of the support 42, the pressure disc 43 is void of any intereference or connection other than engagement between the central shaft 43a and the spring 45. It is noted that centering of the pressure disc is accomplished by engagment between the turntable shaft 30 and the central opening 43b. Deflection of the spring 45 enables the conversion lever 48 interlocked via the bent portions 45a and 48a to rotate clockwise in FIG. 10(a). The center guide arm 49 interlocked via the bent portions 48b and 49a, on the other hand, rotates counterclockwise in FIG. 10(a). Since the rotating movement of the center guide arm 49 is amplified via the conversion lever 48, it becomes greater than the amount of deflection of the spring 45 or the amount of backward movement of the pressure disc 43 so that the guide wheel 50 moves away from the record as shown in FIG. 10(b). The above record-pressing procedure is completed by the switch S₁ which senses the amplitude of the record-pressing force or the amount of deflection of the spring 45 and then switches OFF the plunger 32 through the control circuit.

As is clear from FIG. 10(c), loading the LP record 1L is achieved by placing the EP adapter 38 into contact with the record 1L and urging the saem into the turntable against the spring 38a and bringing the central opening 1La of the record into alignment with the turntable shaft 30. Other steps necessary for loading the LP record are similer to those in the case of the EP record 1E.

Upon the completion of the record-loading procedure the motor 36 stops rotating and the flywheel 35 also stops so that the player is in the standby state. Furthermore, the rotating means including the turntable shaft 30, the turntable 29, the record 1L or 1E, the pressure disc 43 and so forth are free from the record inlet guide roll 21, the center guide wheel 50, the record mounts, the support arms 10, the record support 42, etc. except for engagment with the bearing 28 of the turntable shaft 30 and the spring 43a.

Referring to FIGS. 12a, 12b and 13 through 16, the following will go into details of the record size selection assembly and the pickup assembly. As stated previously, the illustrated player is capable of playing back sounds on the front and back surfaces of the record by the use of the two pickup arms without the need to reload. Reproduction, stop, pickup fast forwarding, etc., are achieved by actuations of the buttons and the control circuit while the plungers 56F and 56R and the motors 59 and 36 are properly operated.

For front playback, the control circuit serves to rotate the flywheel 35 and the turntable 29 by the motor 36 at a rotation rate as determined by the record size selection assembly, thus rotating the disc record. Under the condition as viewed from FIG. 12 the control circuit energizes the plunger 56F and rotates the link 55F clockwise against the spring 55Fb. The actuator plate 54F with the bent portion 54Fa engaged with the hock portion 55Fa of the link 55F rotates counterclockwise. Therefore, the sliding ring 53Fa is forced toward the actuator plate 54F via the link 55F under the influence of the spring 55Fb. The result is that the pickup arm 53F which has rotated clockwise about the guide rail 51F due to its gravity so as to move the stylus 57Fa away from the record 1L or 1E starts rotating clockwise and the pickup stylus 57Fa is mounted on the grooves in the record rotating at a present rotation rate. The stylus 57Fa moves about the record 1 along the guide rail 51F due to driving force originating from gravity caused by the inclination of the guide rail 51F with respect to the center of the turntable 29 and inward force resulting from tracing of the grooves, while tracing the front surface of the record 1.

Through the above mentioned procedure playback is achieved via a playback circuit electrically connected to the cartridge 57F for front playback.

Rear playback is effected in the following manner. The motor 36 is rotated counterclockwise in FIG. 3 through the control circuit, thus rotating the record at a predetermined rotation rate in the same direction as described above. At the same time, the plunger 56R as indicated in FIG. 13 is energized to place the pickup assembly into playback mode in a likewise manner as the front playback as shown in FIG. 13. Reproduction is carried out on the rear surface of the record through the playback circuit electrically connected to the rear cartridge 57R. The pickup assembly in playback mode is shown in a perspective view of FIG. 14.

When fast forwarding the pickup assembly is desirable, the plunger 56F is switched OFF and placed into a position like the stop position as depicted in FIG. 12(a). Then, the fast forward motor 59 of FIG. 15 is driven in a desired direction. The following description is common to front playback and rear playback.

If the plunger 56F is disenergized in playback mode as indicated in FIG. 12(b) or 13, the link 55F and the actuator 54F are moved into the stop position as shown in FIG. 12(a) under the influence of the spring 55Fb and the pickup arm 53F is rotated about the guide rail 51F because of the sliding ring 53Fa being depressed by the actuator. As a result, the driven portion 53Fb is placed into contact with the rubber belt 61. This circumstance is similar to the stop mode. The control circuit enables the motor 59 of FIG. 15 to rotate in a direction as determined by the actuator buttons 4. The rotating movement of the motor 59 permits the rubber belt 61 to rotate in the desired direction via the gears 59b, 60a and the pulley 60L. The pickup arm 53F with its driven portion 53Fb in contact with the rubber belt 61 is driven in a desired direction along the guide rail due to friction regardless of its gravity. For fast forwarding of the pickup arm, the pickup stylus 57Fa is obliged to stop at the most inner groove in the record by means of an angle not shown in connection with the direction toward the center of the turntable and limited by the record size selection assembly detailed below as to the other direction.

The record size selection assembly is detailed in FIG. 16 which shows the situation where the LP record is selected. Operatively interlocked with the switch lever 63 is a selection switch means contained in the control circuit which controls the rotation rate of the turntable-driving motor 36, the rotation position of the record support arms 10 and so forth. In the case of the LP record so selected, the guide shaft 63a of the switch lever 63 and the guide shaft 66b of the sliding plate 66 are so spaced as to guide (align) the periphery of the LP record during insertion thereof. The bent portion 63b of the switch lever 63 and the bent portion 66c of the sliding plate 66 are respectively engageable with the side wall of the driven portion 53Fb and the side wall of the driven portion 53Rb of the pickup arm 53R so that the movement of the pickup 53 especially the pickup stylus 57a may be restricted at the most outer groove on the LP record 1L.

The following events will happen when the selection knob 5 is actuated in the direction of the arrow E and the player is conditioned with the EP record. Upon actuation of the switch knob 5 in the direction of the arrow E the switch lever 63 moves in the same direction, while being clamped at the EP position with the spring 64. Furthermore, the link 65 rotates and the sliding plate 65 shifts in the direction of the arrow E'. As a result, the spacing between the guide shafts 63a and 66b is wide enough to guide the periphery of the EP record. The sliding movement of the lever 63 to the EP position switches the switching means to the EP position. The bent portions 63b and 66c limit the movement of the pickup 53 such that the pickup stylus 57a is mounted outside the grooves in the EP record 1E.

The record may be unloaded in the following manner. As depicted in FIGS. 10(b) and 10(c), the record unloading button of the buttons 4 is actuated so that the control circuit serves to rotate the motor 36 counterclockwise in FIG. 3 and energize the plunger 32 and the plunger 15 of FIG. 4. In a manner like loading of the record, the plunger 32 in the energized state places the rubber roll 25 into contact with the inner wall 35a of the flywheel and thus rotates the shaft 24. The rotation direction of the shaft 24 is opposite to that during record loading (that is, C') so that the turntable driving assembly shifts from the state of FIG. 9(b) to that of FIG. 9(a) through the combination of the nut 26 and the threaded portion 24a. Accordingly, the turntable shaft 30, the turntable 29, etc. shift from the state as shown in FIGS. 10(b) and 10(c) to that as shown in FIG. 10(a). The pressure disc 43 is aligned by the force of the leaf spring 45 and engagement between the tapered surface 44a of the stopper 44 and the tapered surface 42c of the support 42. The center guide plate 49 stands at the forwardly-inclined rotation position under the spring 45 to urge the guide wheel against the record 1L or 1E. The record 1L or 1E, on the other hand, is free from engagement between its center opening and the turntable shaft 30 or the EP adapter 38 or engagment between the mounting surface 41 of the turntable 29 and the mounting surface 47 of the pressure disc 43 so that it may fall somewhat due to its gravity and settle on the mount portions 18b of the record mount 18 as depicted in FIG. 7(b). Once the record 1 is disengaged from the turntable 29 and the pressure disc, the backward position of the turntable is sensed by a detector not shown which in turn switches the plunger 32 OFF. The turntable 29 thus stops moving backwardly and the player is in the state as shown in FIGS. 9(a) and 10(a).

Upon the completion of the backward movement of the turntable the plunger 15 of FIG. 4 is switched OFF under control of the control circuit, placing the rubber roll 13a into contact with the rear face 35b of the flywheel 35 and rotating the shaft 13. The rotation direction of the shaft 13 is opposite to that when the record is lowered so that the record elevator assembly in the state of FIG. 5b enables the support arm 10 to deliver the record 1 seated on the record mount 18 as shown in FIG. 5(a) with the aid of the worm gear 13b, the gear 16, the rotating plate 9, etc.

If the support arm 10 is elevated, then the record 1 on the record mount 18 shifts from the second mount portion 18b of the record mount 18 in a low position as shown in FIG. 7(b) to the sliding inclined surface 18c of the record mount 18 in an elevated position as shown in FIG. 7(a). Thereafter, the record 1 moves to the position contiguous to the first mount portion 18a over the inclined surface 18c due to its gravity, as depicted by the arrow A. The player is thus ready to shift and align a new record onto the first mount portion 18a.

Counterclockwise rotation of the rotating plate 9L as shown in FIG. 5(b) within the record elevator assembly permits the sliding plate 19 to move downwardly as shown in the same figure. Since the engaging portion 20b of the arm 20 is in engaging relationship with the bent portion 19d of the sliding plate 19, the arm 20 which has moved the guide roll 21F forwardly not to interfer with rotation of the record, rotates from the state of FIG. 6(b) to the state of FIG. 6(a) against the spring 20d, thus establishing the spacing $t_1$ between the guide rolls 21F and 21R equal to the thickness of the record for guiding the record 1.

Once the record elevator assembly and the inlet guide assembly have been operated in the above manner, the plunger 15 is switched ON to disable the motor 36 by a support arm rotation position sensor. After the motor 36 and the flywheel 35 have been disabled, the plunger 15 is deenergized so that the rubber roll 13a comes into contact with the rear face 35b of the flywheel under the influence of the spring 14b. The player is ready for loading of a new record.

Through the above procedure, the record 1L or 1E shifts upwardly from the state as denoted by the two-dot phantom line in FIG. 2 to the state as denoted by the one-dot phantom line wherein the record may be exchanged or reloaded.

The invention being thus described, it will be obvious that the same may be varied in many ways. Such variations are not to be regarded as a depature from the spirit and scope of the invention, and all such modifications are intended to be included within the scope of the following claims.

What is claimed is:

1. A record player for selectively playing either side of a record disc comprising:
   a player body being vertically disposed and including a record inlet slot in an upper surface thereof;
   at least one support arm being initially positioned in close proximity to said record inlet slot for directly receiving and supporting a record disc in a vertical disposition;
   a turntable operatively positioned for rotation within said player body and including a turntable shaft being horizontally positioned and axially movable for receiving a record disc;
   drive means operatively connected to said turntable for imparting rotation thereto;
   record movement drive means being operatively connected to said turntable and to said support arm for selectively lowering said support arm to position a record disc adjacent to said turntable shaft and for selectively raising said support arm for removal of said record disc from said player body;
   a turntable disc operatively mounted on said turntable;

turntable reciprocating drive means being initially in an inoperative position wherein said turntable disc and said turntable shaft are in a first position when a record disc is not positioned adjacent to said turntable shaft and being activated for imparting an axial movement to said turntable disc and said turntable shaft to a second position when a record disc is lowered by said at least one support arm to position a record disc adjacent to said turntable shaft; and pickup arm means being operatively positioned adjacent to a first and second playing surface of said record for selectively playing either side thereof;

said record movement drive means and said turntable reciprocating drive means being both selectively energized by said turntable which is operatively rotated by said drive means.

2. A record player according to claim 1, wherein two support arms are operatively positioned to engage peripheral edge portions of a record disc positioned into said inlet slot.

3. A record player according to claim 1, wherein said turntable means includes a flywheel opratively connected to said drive means and said turntable disc and turntable shaft being axially displaceable away from said flywheel for engaging and disengaging a record disc.

4. A record player according to claim 2, wherein each of said two support arms is operatively connected to a rotating plate being operatively connected to said record movement drive means for raising and lowering a record disc.

5. A record player according to claim 4, wherein each support arm includes a record mount having a first mount surface for engaging a peripheral edge of a record disc during lowering of the record disc and a second mount surface for engaging a peripheral edge of a record disc during the raising of the record disc.

6. A record player according to claim 1, wherein said record movement drive means includes a friction engaging means operatively movable between a first position in engagement with said turntable means and a second position out of engagement with said turntable means, said engagement means being driven to rotate in said first position and being operatively connected through a gearing arrangement to selectively raise or lower said at least one support arm.

7. A record player according to claim 1, wherein said turntable reciprocating drive means includes a friction engaging member operatively, selectively engageable with said turntable means for imparting rotation thereto, said friction engaging member being operatively positioned on a threaded shaft rotatably mounted on a support plate, a nut is operatively positioned for movement along said threaded shaft, a lever is operatively connected to said nut and said turntable disc and said turntable shaft for imparting movement thereto between said first and second positions.

8. A record player according to claim 7, wherein said lever includes elongated slots therein and said turntable shaft includes a pin outwardly projecting therefrom, said lever selectively imparting a reciprocating force to said pin for imparting a reciprocating force to said turntable disc and said turntable shaft.

9. A record player according to claim 1, wherein said pickup arm means includes two styli, one being operatively positioned on each side of said record disc, a lever and plunger assembly being operatively connected to each individual stylus for selectively moving said stylus into engagement with a record disc and out of engagement with a record disc, and stylus drive means for selectively imparting a transverse movement to each of said styli for selectively playing either side of a record disc.

10. A record player according to claim 1, and further including plunger means operatively connected to said record movement drive means for selectively actuating and deactuating said record movement drive means.

11. A record player according to claim 1, and further including plunger means operatively connected to said turntable reciprocating drive means for selectively actuating and deactuating said turntable reciprocating drive means.

12. A record player according to claim 1, and further including a pressure disc operatively positioned in juxtaposition to said turntable disc and being spaced therefrom by a record disc, said pressure disc engaging a record disc to hold the record disc adjacent to said turntable disc when said turntable disc is in the second position.

13. A record player according to claim 9, and further including a guide rail for guiding each stylus during transverse movement across a record disc.

14. A record player according to claim 9, wherein said styli are positioned symmetrically with respect to each other and driven in the same direction.

15. A record player according to claim 1, and further including a switching means for selecting the rotation speed of said turntable means as a function of record disc size and for limiting movement of said at least one support arm as a function of record disc size.

* * * * *